(12) United States Patent
Taniguchi et al.

(10) Patent No.: US 6,443,871 B2
(45) Date of Patent: Sep. 3, 2002

(54) CONTROL APPARATUS AND METHOD OF BELT-TYPE CONTINUOUSLY VARIABLE TRANSMISSION

(75) Inventors: Hiroji Taniguchi, Okazaki; Katsumi Kono, Toyota; Kenji Matsuo, Toyota; Hideki Yasue, Toyota; Tadashi Tamura, Nishikamo-gun; Daisuke Inoue, Toyota; Yoshiaki Yamamoto, Toyota; Hiroshi Morioka, Toyota; Hiroki Kondo, Toyota; Ryoji Habuchi, Okazaki, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/843,810

(22) Filed: Apr. 30, 2001

(30) Foreign Application Priority Data

May 23, 2000 (JP) ........................ 2000-151637

(51) Int. Cl.$^7$ ............................................. F16H 61/12
(52) U.S. Cl. ........................... 477/44; 477/906; 474/70
(58) Field of Search ..................... 474/28, 70; 477/43, 477/44, 45, 46, 906; 701/62, 63

(56) References Cited

U.S. PATENT DOCUMENTS

| | | | | |
|---|---|---|---|---|
| 5,157,992 A | * | 10/1992 | Hayashi et al. | 474/28 |
| 5,182,968 A | * | 2/1993 | Mott | 474/11 |
| 5,203,233 A | * | 4/1993 | Hattori et al. | 474/101 |
| 5,211,083 A | * | 5/1993 | Hattori et al. | 192/3.3 |
| 5,334,102 A | * | 8/1994 | Sato | 474/18 |

FOREIGN PATENT DOCUMENTS

| | | |
|---|---|---|
| JP | A 03-213770 | 9/1991 |
| JP | A 08-233047 | 9/1996 |
| JP | A 11-182666 | 7/1999 |

* cited by examiner

Primary Examiner—Charles A Marmor
Assistant Examiner—Ankur Parekh
(74) Attorney, Agent, or Firm—Oliff & Berridge PLC

(57) ABSTRACT

An apparatus and a method control a belt-type continuously variable transmission of a vehicle having a continuously variable speed ratio, which is a ratio of a rotation speed of an input shaft to a rotation speed of an output shaft. The speed ratio of the transmission is controlled by changing a groove width of each of the pulleys, and a belt clamping pressure applied to at least one of the pulleys to clamp the torque transfer belt also is controlled. Furthermore, the speed ratio of the transmission is set to a low-load speed ratio when it is determined that control of the belt clamping pressure has failed and the belt clamping pressure is raised to a high level. The low-load speed ratio is predetermined so that a load applied to the torque transfer belt is substantially minimized.

18 Claims, 9 Drawing Sheets

CONTROL APPARATUS AND METHOD OF BELT-TYPE CONTINUOUSLY VARIABLE TRANSMISSION

INCORPORATION BY REFERENCE

The disclosure of Japanese Patent Application No. 2000-151637 filed on May 23, 2000, including the specification, drawings and abstract, is incorporated herein by reference in its entirety.

BACKGROUND OF THE INVENTION

1. Field of Invention

The invention relates to an apparatus and a method for controlling a belt-type continuously variable transmission, and, more particularly, to a control process performed when a clamping pressure for securing sufficient belt tension is raised to a high level at the time of a failure of a belt clamping pressure control device.

2. Description of Related Art

A belt-type continuously variable transmission that is conventionally employed in a vehicle drive apparatus is disposed in a power transmission path, and includes a pair of pulleys whose groove widths are variable, and a torque transfer belt that is wound around the pulleys for power transmission or torque transfer by use of frictional force. The continuously variable transmission is able to continuously change the speed ratio, which is a ratio of the input-shaft rotation speed on a power source side to the output-shaft rotation speed on the side of drive wheels (i.e., input-shaft rotation speed/output-shaft rotation speed). The belt-type continuously variable transmission usually includes a speed ratio control device that controls the speed ratio of the transmission by changing the groove widths of the pulleys, and a clamping pressure control device that controls the belt clamping pressure for clamping the torque transfer belt. One example of such a belt-type continuously variable transmission is disclosed in Japanese laid-open Patent Publication No. 11-182666. In a vehicle disclosed in this publication, the speed ratio and the belt clamping pressure are controlled by use of hydraulic pressure. When a linear solenoid valve for controlling the belt clamping oil pressure fails, a clutch pressure applied from a forward/reverse-drive switching mechanism is used to control the belt clamping pressure so as to prevent an excessively large load from being imposed on the torque transfer belt or to avoid slippage of the belt.

However, the control of the belt clamping pressure using the clutch pressure of the forward/reverse-drive switching mechanism requires an oil path(s), a changeover or switch valve(s), a solenoid-operated valve(s), etc., for switching oil flow paths in a hydraulic circuit, which makes the apparatus complicated in construction and increased in cost.

SUMMARY OF THE INVENTION

It is an object of the invention to provide control apparatus and method of a continuously variable transmission, which employs a simple arrangement for preventing an excessively large load from being applied to a torque transfer belt to reduce the durability thereof, when the clamping pressure is raised to a high level upon a failure of a mechanism that controls the clamping pressure.

To accomplish the above and/or other objects, the invention provides an apparatus for controlling a belt-type continuously variable transmission of a motor vehicle that is provided in a power transmission path, which transmission includes an input shaft disposed on a power source side of the transmission, an output shaft disposed on a side of the transmission opposite from the power source side, a pair of pulleys mounted on the input shaft and the output shaft, respectively, and a torque transfer belt that is wound around the pulleys to effect power transmission by use of frictional force. The transmission has a continuously variable speed ratio, which is a ratio of a rotation speed of the input shaft to a rotation speed of the output shaft. A controller of the apparatus controls the speed ratio of the continuously variable transmission by changing a groove width of each of the pulleys, and controls a belt clamping pressure applied to at least one of the pulleys to clamp the torque transfer belt. The controller also sets the speed ratio of the transmission to a low-load speed ratio when it is determined that control of the clamping pressure has failed and the belt clamping pressure is raised to a high level, the low-load speed ratio being predetermined so that a load that is applied to the torque transfer belt is substantially minimized.

In the control apparatus of the belt-type continuously variable transmission, when the belt clamping pressure is increased at the time when control of the clamping pressure fails, the speed ratio of the transmission is set to the low-load speed ratio that is predetermined so that a stress to be imposed on the torque transfer belt is substantially minimized. Thus, the load applied to the torque transfer belt is reduced, which leads to an improved durability of the belt. The low-load speed ratio may be substantially set to 1.0 if the control range of the speed ratio includes 1.0. In this case, the belt engagement diameter of one of the pulleys is made substantially equal to that of the other pulley. If the control range of the speed ratio does not include 1.0, the low-load speed ratio may be set to a value that is as close to 1.0 as possible. In this connection, if the belt engagement diameter (effective diameter) of the one of the pulleys becomes greater or less than that of the other pulley, the area of contact of the torque transfer belt with the pulley having the smaller belt engagement diameter is reduced, resulting in an increase in the load per unit area. However, if the speed ratio is substantially equal to 1, that is, if the belt engagement diameters of the pair of pulleys are equal to each other, even load is applied to the torque transfer belt, and the maximum load per unit area is reduced.

According to the invention, the control of the belt clamping pressure at the time of a failure is accomplished by keeping the speed ratio of the belt-type continuously variable transmission at the predetermined low-load speed ratio. Accordingly, the controller has a greatly simplified construction and is available at a reduced cost, as compared with the conventional arrangement in which the belt clamping pressure is controlled by using a clutch pressure of a forward/reverse-drive switching device. If the speed ratio of the continuously variable transmission is fixed to 1.0, the vehicle running performance greatly deteriorates because of an incapability of increasing or decreasing the torque by changing the speed ratio. However, the apparatus according to the invention can accomplish an intended purpose in that the vehicle is allowed to limp-home to a repair shop, or the like, rather than being unable to run due to, for example, breakage of the torque transfer belt. 3.

In one preferred embodiment of the invention, the above-indicated controller also restricts an input torque that is transmitted from the power source to the continuously variable transmission, when it is determined that control of the belt clamping pressure has failed and the belt clamping pressure is raised to a high level. This arrangement makes it possible to effectively prevent an excessively large load from being applied to the torque transfer belt, and to avoid slippage of the belt.

In another preferred embodiment of the invention, the controller sets the speed ratio to the low-load speed when the rotation speed of the output shaft is less than a predetermined value, and sets the speed ratio to a high-speed speed ratio that is smaller than the low-load speed ratio when the rotation speed of the output shaft is equal to or greater than the predetermined value. Therefore, when the speed ratio of the continuously variable transmission is changed to the low-load speed ratio upon a failure of a mechanism for controlling the belt clamping pressure, the speed of rotation of the power source is prevented from exceeding a permissible speed (or upper limit) thereof, or an apparatus in which the transmission is mounted is prevented from failing to operate properly due to a rapid change in the speed ratio. For example, if the belt-type continuous variable transmission is shifted down to the low-load speed ratio while the speed ratio of the transmission is smaller than the low-load speed ratio and the output-shaft rotational speed is higher than a predetermined value, the input-shaft rotational speed and the speed of rotation of the power source are increased due to the downshift, giving rise to a possibility that the speed of the power source exceeds a permissible level (or upper limit), resulting in a serious failure. Also, if the belt-type continuous variable transmission of a motor vehicle is shifted down to a great extent against the driver's intention, large shift shocks may occur due to the inertia of the power source, resulting in deterioration in the riding comfort.

While the control of the speed ratio to the low-load speed ratio is implemented depending upon the output-shaft rotational speed in the above embodiment, the same control may be implemented depending upon the vehicle speed corresponding to the output-shaft rotational speed. In the case where the power source is an internal combustion engine, such as a gasoline engine, the high-speed speed ratio is at least determined so that the engine does not suffer from over-revolution (or over-speed). However, the high-speed speed ratio is desirably set to a speed ratio that is smaller than the speed ratio at which occurrence of over-revolution can be prevented, so as to avoid a situation in which the riding comfort is greatly deteriorated due to a large degree of downshift against the driver's intention. The above-indicated predetermined value of the output-shaft rotational speed or vehicle speed may be determined so that the riding comfort will not be greatly deteriorated even in the case where the transmission is shifted down from the minimum speed ratio. The high-speed speed ratio may be set to a predetermined fixed value, or may be set to a varying value that depends upon a parameter, such as the output-shaft rotational speed or the vehicle speed. For example, the high-speed speed ratio may be made constant irrespective of the vehicle speed.

BRIEF DESCRIPTION OF THE DRAWINGS

The foregoing and further objects, features and advantages of the invention will become apparent from the following description of a preferred embodiment with reference to the accompanying drawings, wherein like numerals are used to represent like elements and wherein.

DETAILED DESCRIPTION OF PREFERRED EMBODIMENTS

Figure 1:
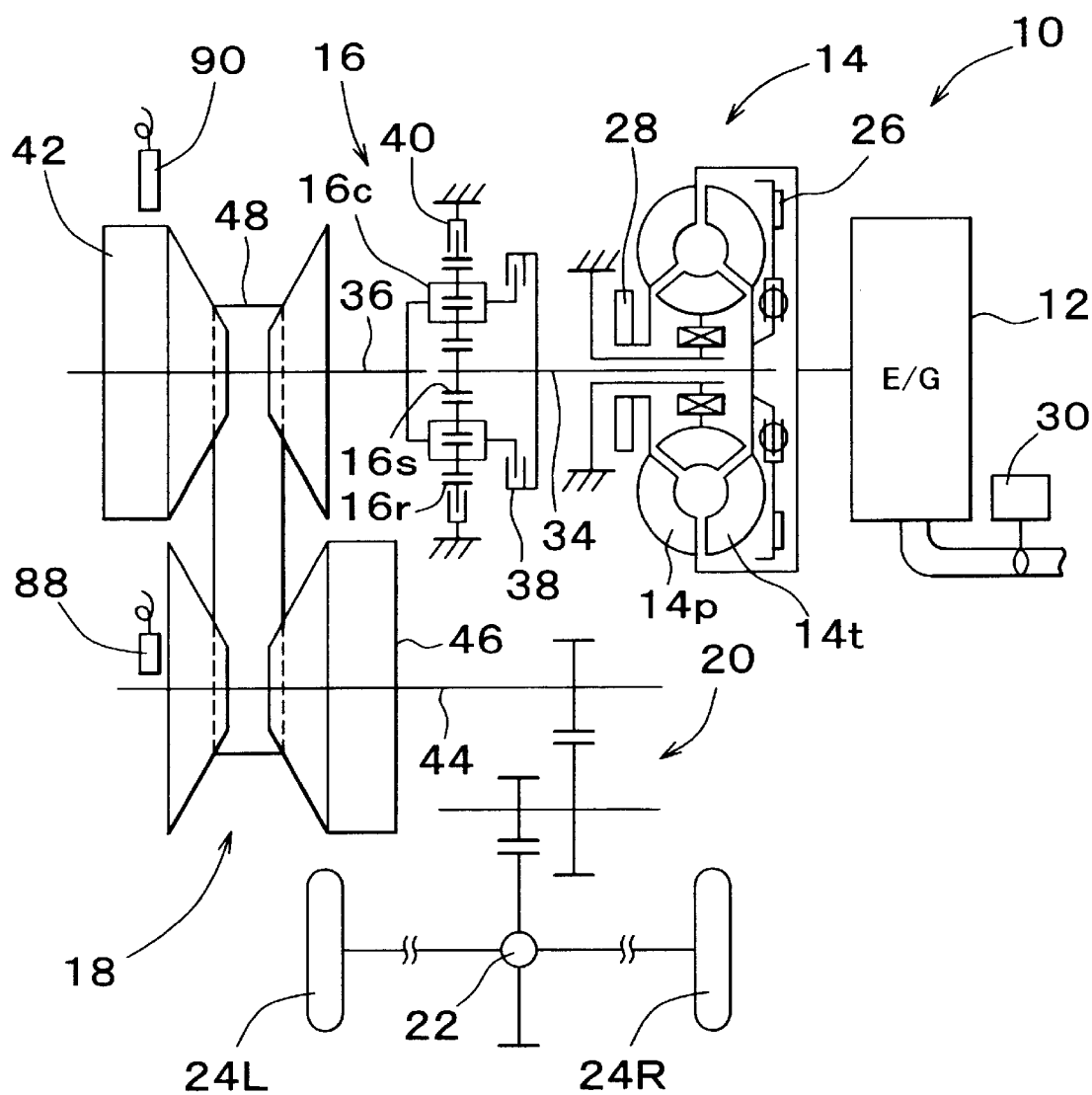
FIG. 1 is a schematic diagram illustrating a vehicle drive apparatus to which the invention is applied.

The invention is applicable to a control apparatus of a belt-type continuously variable transmission used in a drive apparatus for a motor vehicle. Normally, a belt-type continuously variable transmission is disposed in a power transmission path between a power source for driving the vehicle and drive wheels. However, the invention is equally applicable to a control apparatus of a belt-type continuously variable transmission for use in applications other than vehicles. The power source for driving the vehicle may be selected from various power sources, including internal combustion engines, such as gasoline engines and diesel engines, that operate through combustion of fuel, and electric motors that operate with electric energy. The power source may include both an internal combustion engine and an electric motor.

In the belt-type continuously variable transmission, the speed ratio and the belt clamping pressure or force are controlled by controlling, for example, hydraulic pressures applied to hydraulic cylinders, or the like. A speed-ratio control device and a clamping pressure control device include electromagnetic check valves or solenoid-operated valves, linear solenoid valves, etc. Failures in the clamping pressure control device, which make it impossible to control the belt clamping pressure, include mechanical failures of those solenoid valves or an electric system for applying magnetizing current to the solenoid valves, failures in a control system, etc.

The speed ratio control device may operate in various manners. For example, the speed ratio control device determines a target speed ratio based on a shift condition, and controls the transmission so that an actual speed ratio becomes equal to the target speed ratio. In another example, the speed ratio control device determines a target input-side rotation speed based on a vehicle speed, an output-side rotation speed, etc., and controls the transmission in a feedback fashion so that an actual input-side rotation speed becomes equal to the target input-side rotation speed. Since the target input-side rotation speed corresponds to the target speed ratio, it is not always necessary to obtain or determine the target speed ratio itself.

The aforementioned shift condition is set or established in the form of an arithmetic expression, a map or the like, which uses, as parameters, various driving states such as an output requirement (e.g., an accelerator operating amount) made by a vehicle driver, and a vehicle speed (corresponding to an output-shaft rotation speed). It is not necessary to automatically control the speed ratio. In other words, the speed ratio may be changed as desired through a manual operation performed by the driver or vehicle operator, under a certain condition, for example, that the vehicle is running at or above a predetermined vehicle speed.

The clamping pressure control device is constructed so as to control a belt clamping pressure, for example, based on a clamping pressure control condition (in the form of a map, an arithmetic expression, etc.) that is predetermined by using, as parameters, various parameters such as an engine output and an output requirement (e.g., an accelerator operating amount) that correspond to torque to be transferred, and a speed ratio of the transmission.

A preferred embodiment of the invention will be hereinafter described with reference to the accompanying drawings.

Figure 2:
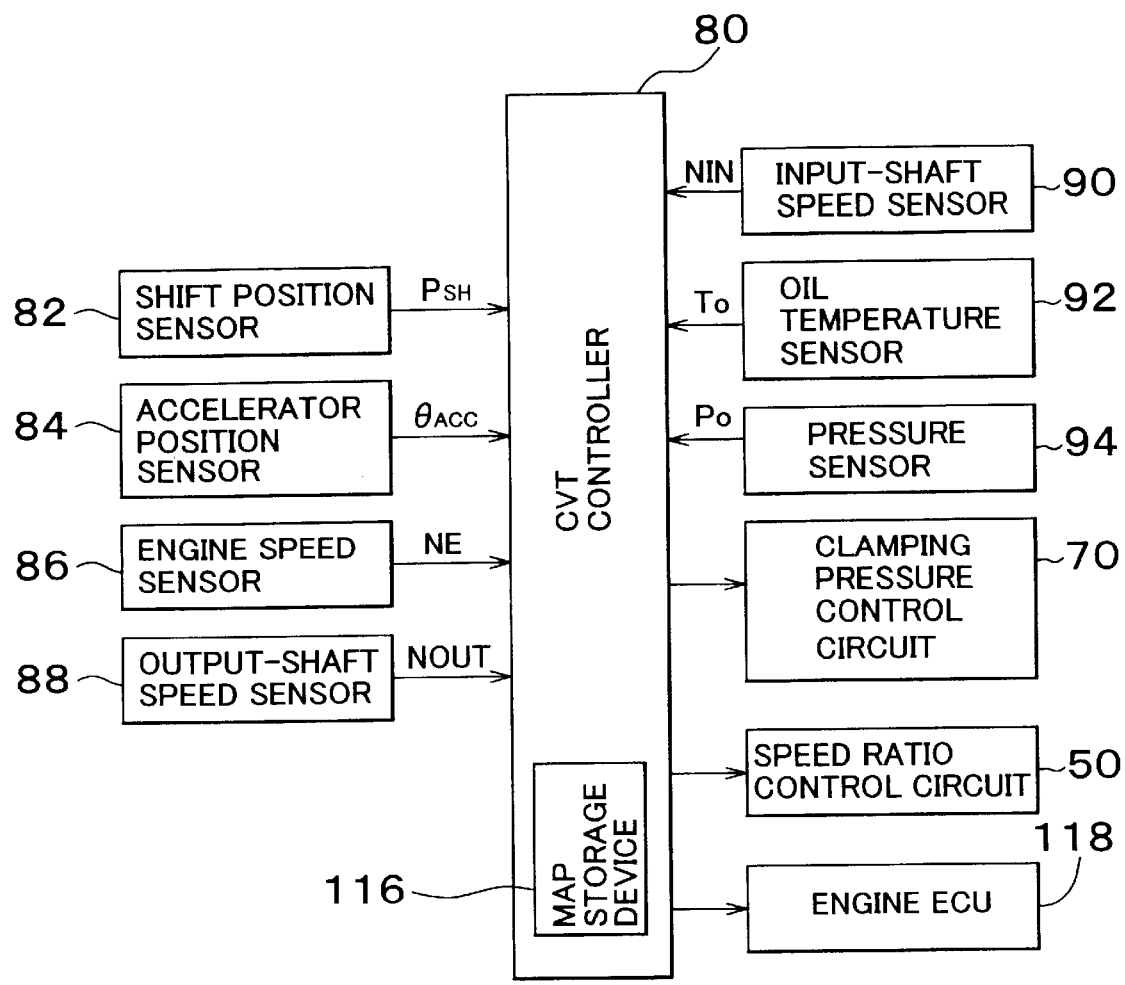
FIG. 2 is a block diagram illustrating a control system of a belt-type continuously variable transmission in the vehicle drive apparatus shown in FIG. 1.

FIG. 1 is a schematic diagram showing a vehicle drive apparatus 10 to which the invention is applied. The vehicle drive apparatus 10 is of the transversely-mounted type, and is suitably employed in FF (front-engine and front-drive) type vehicles. The vehicle drive apparatus 10 has an internal combustion engine 12 that is used as a power source for running the vehicle. The output of the engine 12 is transmitted to a differential gear set 22 via a torque converter 14, a forward/reverse-drive switching device 16, a belt-type continuously variable transmission (CVT) 18, and a speed reducing gear train 20, and is then distributed to right-hand and left-hand side drive wheels 24R, 24L. The engine 12 includes an electrically operated throttle valve 30 for electrically adjusting the flow rate of intake air. An engine ECU (electronic control unit) 118 as shown in FIG. 2 performs engine output control, for example, by controlling fuel injection or opening/closing of the throttle valve 30, in accordance with an accelerator operating amount $\theta_{ACC}$ indicative of an output requirement made by the vehicle driver. In this manner, the output of the engine 12 is increased or reduced under control of the ECU 118.

The torque converter 14 has a pump impeller 14p connected to a crankshaft of the engine 12, and a turbine runner 14t connected to the forward/reverse-drive switching device 16 via a turbine shaft 34. The torque converter 14 utilizes a fluid for transmitting power from the engine 12 to the switching device 16. A lockup clutch 26 is provided between the pump impeller 14p and the turbine runner 14t, and is capable of coupling the impeller 14p directly with the turbine runner 14t so that the impeller 14p and the turbine runner 14t can rotate together as a unit. The pump impeller 14p is provided with a mechanical oil pump 28 that generates hydraulic pressures for controlling the speed ratio of the continuously variable transmission 18, for producing a belt clamping pressure for clamping a torque transfer belt of the transmission 18, and for supplying a lubricant to various portions of the apparatus 10.

The forward/reverse-drive switching device 16 generally consists of a double-pinion-type planetary gear set or device. The switching device 16 includes a sun gear 16s to which the turbine shaft 34 of the torque converter 14 is connected, a carrier 16c to which an input shaft 36 of the continuously variable transmission 18 is connected, and a ring gear 16r. When a clutch 38 disposed between the carrier 16c and the sun gear 16s is engaged, the forward/reverse-drive switching device 16 is rotated as a unit with the turbine shaft 34 being directly coupled with the input shaft 36, so that forward driving force is transmitted to the drive wheels 24R, 24L. When a brake 40 disposed between the ring gear 16r and a housing is engaged and the clutch 38 is released, the input shaft 36 is rotated in a direction opposite to the rotating direction of the turbine shaft 34, so that reverse driving force is transmitted to the drive wheels 24R, 24L to run the vehicle in a reverse direction.

The belt-type continuously variable transmission 18 has an input-side variable pulley 42 which is provided on the input shaft 36 and whose V-shaped groove width is variable, an output-side variable pulley 46 which is provided on an output shaft 44 and whose V-shaped groove width is variable, and a torque transfer belt 48 that is wound around the variable pulleys 42, 46. In the continuously variable transmission 18, power is transmitted by utilizing friction between the torque transfer belt 48 and the variable pulleys 42, 46. Each variable pulley 42, 46 is provided with a hydraulic cylinder for changing its V-shaped groove width. A speed ratio control circuit 50 as shown in FIG. 2 is provided for controlling the hydraulic pressure in the hydraulic cylinder of the input-side variable pulley 42, thereby to change the V groove width of each variable pulley 42, 46 and change the diameter (effective diameter) of each pulley at which the torque transfer belt 48 engages with the pulley. With this arrangement, the speed ratio $\gamma$(=the speed of rotation of the input shaft NIN/the speed of rotation of the output shaft NOUT) can be continuously varied.

Figure 4:
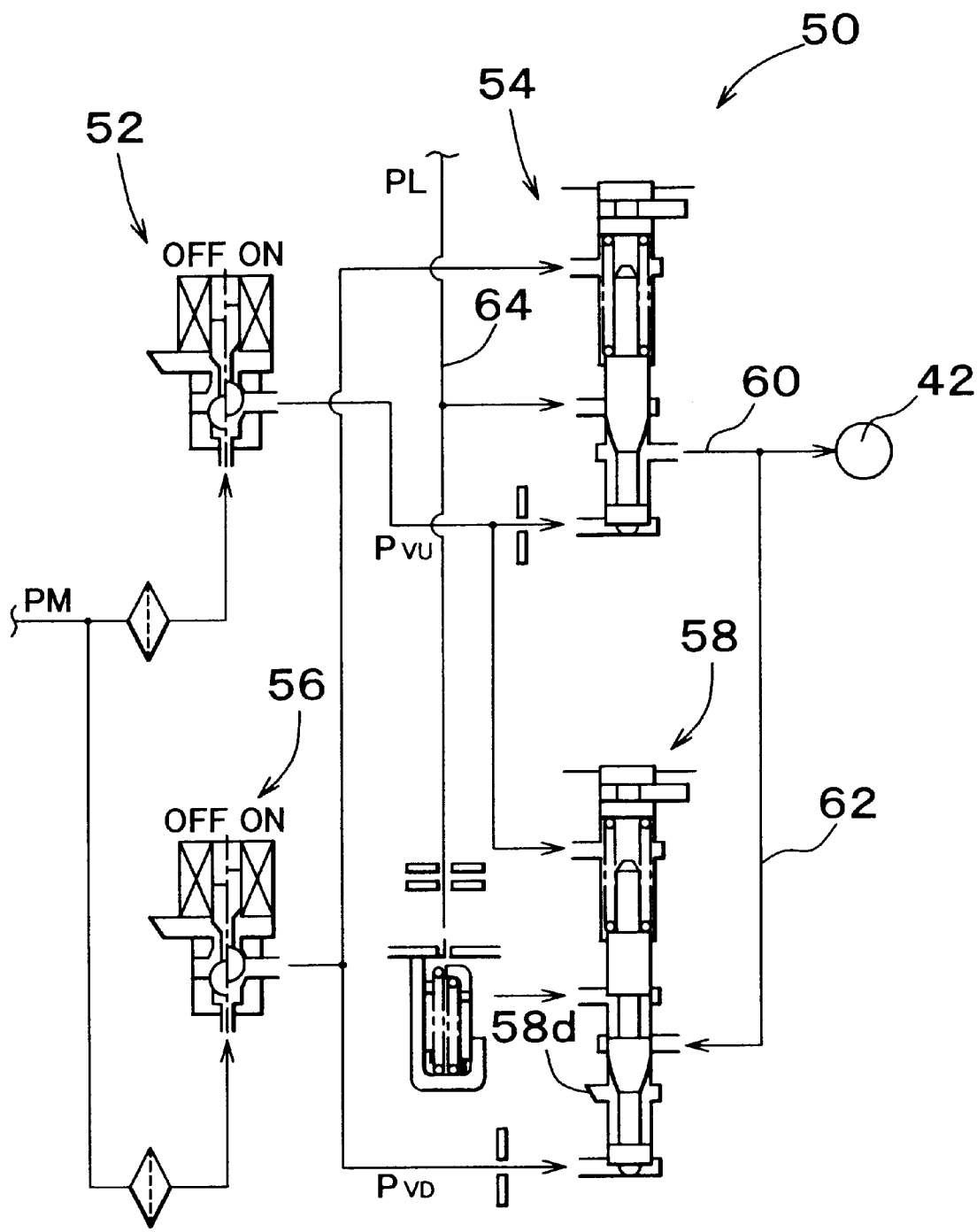
FIG. 4 is a circuit diagram illustrating an example of a speed ratio control circuit as shown in FIG. 2.

FIG. 4 shows an example of the speed ratio control circuit 50. The speed ratio control circuit 50 has a solenoid-operated valve 52 and a flow control valve 54 for upshifts in which the speed ratio $\gamma$ is reduced, and a solenoid-operated valve 56 and a flow control valve 58 for downshifts in which the speed ratio $\gamma$ is increased. When a CVT controller 80 as shown in FIG. 2 controls the upshift solenoid-operated valve 52 of the speed ratio control circuit 50 with a controlled duty ratio, the solenoid-operated valve 52 reduces a modulator pressure PM to a suitable control pressure $P_{VU}$, and generates the control pressure $P_{VU}$ to the flow control valve 54. Then, a line pressure PL that has been regulated in accordance with the control pressure $P_{VU}$ in the flow control valve 54 is supplied via a supply passage 60 to the hydraulic cylinder of the input-side variable pulley 42, so that the V-shaped groove width of the input-side variable pulley 42 is reduced, and the speed ratio $\gamma$ is reduced. When the CVT controller 80 controls the downshift solenoid-operated valve 56 with a controlled duty ratio, the solenoid-operated valve 56 reduces the modulator pressure PM to a suitable control pressure $P_{VD}$, and generates the control pressure $P_{VD}$ to the flow control valve 58. As a result, a drain port 58d is opened in accordance with the control pressure $P_{VD}$, so that hydraulic oil is drained at a certain flow rate from the input-side variable pulley 42 through a discharge passage 62. As a result, the V-shaped groove width is increased, and the speed ratio $\gamma$ is increased. Even when the speed ratio $\gamma$ is almost constant, and no hydraulic oil needs to be supplied to the input-side variable pulley 42, the flow control valve 54 communicates a line oil passage 64 with the supply passage 60 with a predetermined flow cross-sectional area, so that a suitable hydraulic pressure is applied to the variable pulley 42 in order to prevent the speed ratio from changing due to oil leakage.

Figure 5:
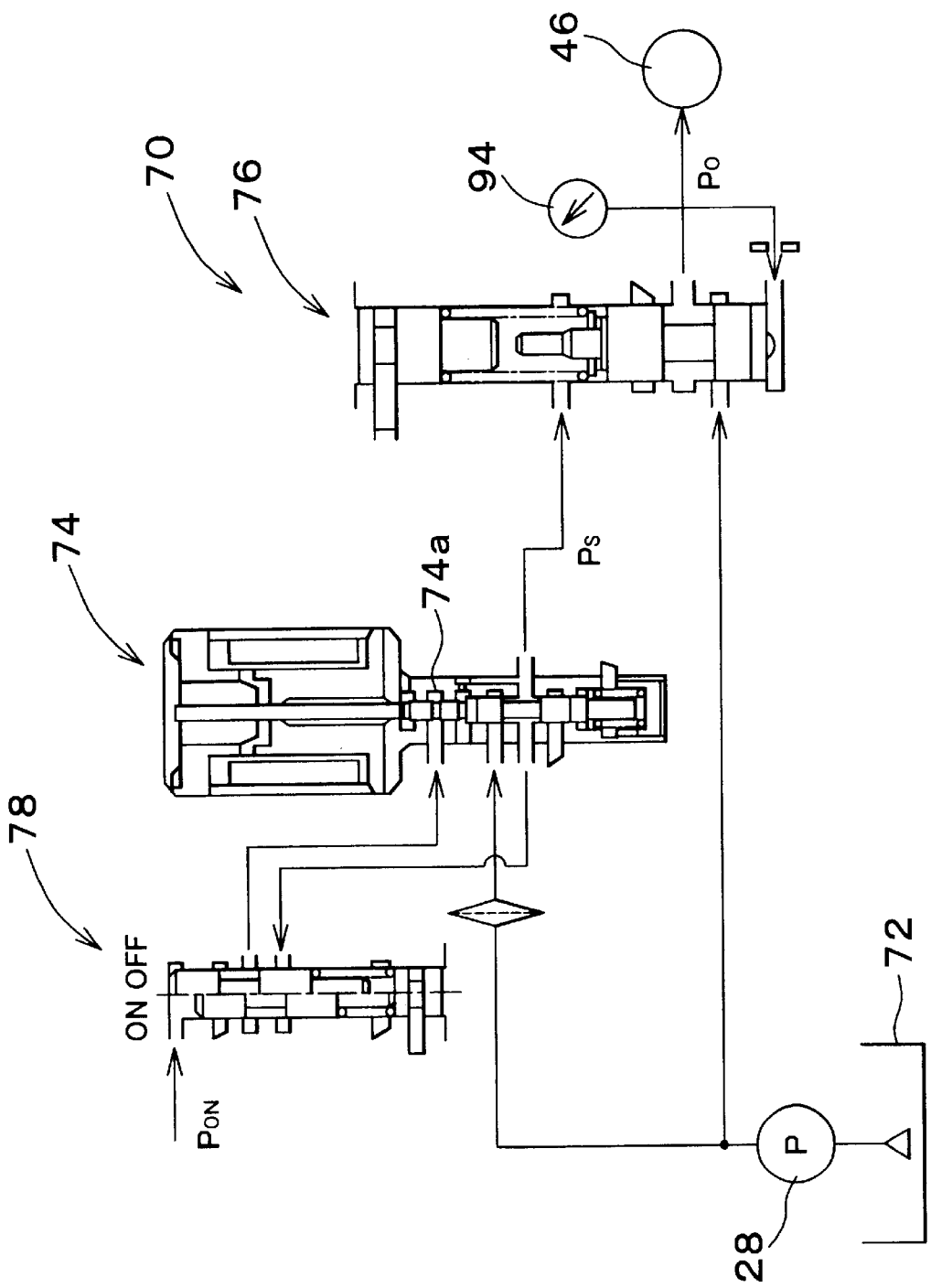
FIG. 5 is a circuit diagram illustrating an example of a clamping pressure control circuit as shown in FIG. 2.

The hydraulic pressure in the hydraulic cylinder of the output-side variable pulley 46 is regulated under control of a clamping pressure control circuit 70 as shown in FIG. 2 so that the torque transfer belt 48 will not slip. FIG. 5 shows an example of the clamping pressure control circuit 70. A hydraulic oil that is pumped from an oil tank 72 by the oil pump 28 is supplied to a linear solenoid valve 74, and is also supplied to the hydraulic cylinder of the output-side variable pulley 46 via a clamping pressure control valve 76. When the CVT controller 80 continuously controls magnetizing current applied to the linear solenoid valve 74, the linear solenoid valve 74 continuously regulates the pressure of hydraulic oil supplied from the oil pump 28, and generates a resulting control pressure $P_S$ to the clamping pressure control valve 76. As the control pressure Ps increases, a hydraulic pressure $P_O$ of hydraulic oil that is supplied from the clamping pressure control valve 76 to the hydraulic cylinder of the output-side variable pulley 46 increases in accordance with the control pressure Ps, so as to increase the belt clamping force, i.e., the frictional force between the torque transfer belt 48 and the variable pulleys 42, 46.

The above-described clamping pressure control circuit 70 further includes a cutback valve 78. When the cutback valve 78 is ON, the control pressure $P_S$ is supplied to a feedback chamber 74a of the solenoid valve 74. When the cutback valve 78 is OFF, the supply of the control pressure $P_S$ is discontinued, and the feedback chamber 74a is exposed to the atmosphere. In this manner, the control pressure $P_S$, and consequently the hydraulic pressure $P_O$, is switched to a lower level (i.e., is reduced or cut back) when the cutback valve 78 is ON, as compared with the case where the cutback valve 78 is OFF. The cutback valve 78 is switched ON in response to a signal pressure $P_{ON}$ supplied from a solenoid valve (not shown) when the lockup clutch 26 of the torque converter 14 is ON (engaged).

The CVT controller 80 shown in FIG. 2 includes a microcomputer. By processing signals in accordance with programs pre-stored in a ROM while utilizing the temporary storage function of a RAM, the CVT controller 80 performs speed ratio control and clamping pressure control on the belt-type continuously variable transmission 18. The CVT controller 80 is supplied with signals indicating a shift position $P_{SH}$ of a shift lever, an amount of operation of an accelerator pedal $\theta_{ACC}$, an engine speed NE, a speed NOUT (corresponding to the vehicle speed V) of rotation of the output shaft 44, a speed NIN of rotation of the input shaft 36, an oil temperature $T_O$ of the hydraulic circuit, a hydraulic pressure $P_O$ of the output-side variable pulley 46, etc., which are respectively received from a shift position sensor 82, an accelerator position sensor 84, an engine speed sensor 86, an output-shaft speed sensor 88, an input-shaft speed sensor 90, an oil temperature sensor 92, a hydraulic pressure sensor 94, etc.

A vehicle driver or operator manipulates the shift lever so as to select one of a plurality of shift positions $P_{SH}$, which include a D range for forward drive, an R range for reverse drive, an N range for cutting off power transmission, and a P range for parking, for example. When the shift lever is operated to the D range, the brake 40 of the forward/reverse-drive switching device 16 is disengaged or released and the clutch 38 of the device 16 is engaged. When the shift lever is operated to the R range, the clutch 38 is released and the brake 40 is engaged. When the shift lever is operated to the N range or the P range, both the clutch 38 and the brake 40 are released, so that power transmission is cut off or disconnected. When the P range is selected, rotation of the drive wheels 24R, 24L is mechanically inhibited by a mechanical parking lock mechanism.

Figure 3:
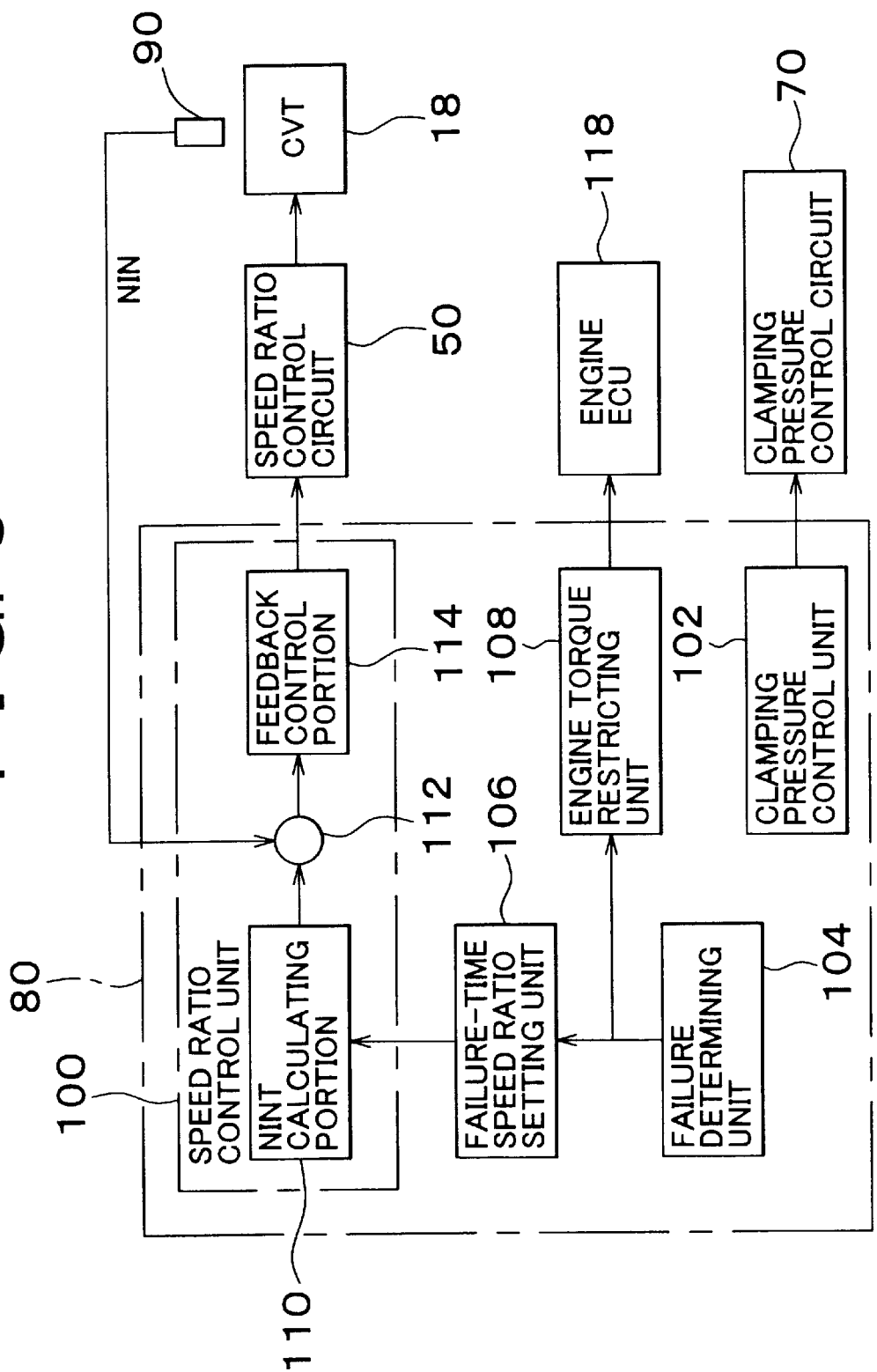
FIG. 3 is a block diagram illustrating functions of a CVT controller shown in FIG. 2.

As shown in FIG. 3, the CVT controller 80 functionally includes a speed ratio control unit 100, a clamping pressure control unit 102, a failure determining unit 104, a failure-time speed ratio setting unit 106, and an engine torque restricting unit 108.

Figure 7:
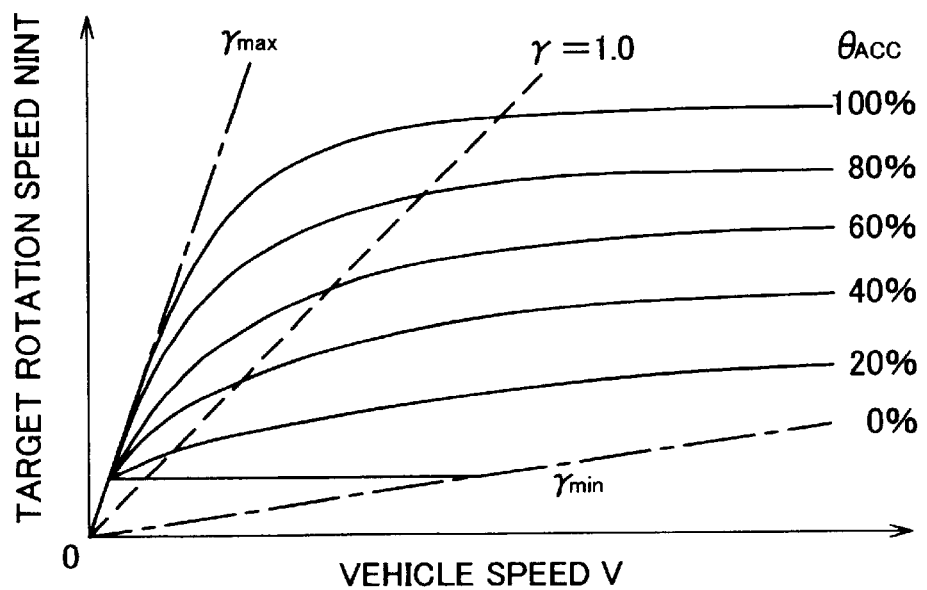
FIG. 7 is a shift map used to determine a target rotation speed NINT in speed ratio control performed by the speed ratio control unit as shown in FIG. 3.

The speed ratio control unit 100 includes an NINT calculating portion 110, a comparing portion 112, and a feedback control portion 114. The NINT calculating portion 110 calculates a target input-side (input-shaft) rotation speed NINT with reference to a shift map that is predetermined by using, as parameters, the accelerator operating amount $\theta_{ACC}$ indicating an output required by the vehicle operator or driver, and the vehicle speed V (corresponding to the speed NOUT of the output shaft 44) as indicated in FIG. 7. As is understood from the map of FIG. 7, which represent shift conditions, the target input-shaft speed NINT is set so as to provide a larger speed ratio γ as the vehicle speed V is lower and the accelerator operating amount $\theta_{ACC}$ is larger. Furthermore, since the vehicle speed V corresponds to the output-shaft rotation speed NOUT, the target speed NINT, which is a target value of the speed of rotation NIN of the input shaft, corresponds to a target speed ratio, which is determined within a range between a minimum speed ratio $\gamma_{min}$ and a maximum speed ratio $\gamma_{max}$ of the continuously variable transmission 18. If the horizontal axis in the graph of FIG. 7 represents the output-shaft rotation speed NOUT in place of the vehicle speed V, the scale of the horizontal axis is the same as that of the vertical axis (representing target input-side rotation speed NINT). In this case, a straight line (i.e., the broken line in FIG. 7) that extends through the origin O at an angle of 45° corresponds to the speed ratio γ=1.0. This speed ratio of 1.0 is included in the range of control of the speed ratio γ of the belt-type continuously variable transmission. The aforementioned shift map is pre-stored in a map storage device (ROM or the like) 116 of the CVT controller 80.

The comparing portion 112 calculates a speed deviation ΔNIN of an actual input-shaft rotation speed NIN from the target input-shaft rotation speed NINT, and outputs the deviation ΔNIN to the feedback control portion 114. The feedback control portion 114 then controls the solenoid-operated valves 52, 56 of the speed ratio control circuit 50 in a feedback fashion, so that the speed deviation ΔNIN becomes equal to zero. Thus, the supply and discharge of hydraulic oil to and from the hydraulic cylinder of the input-side variable pulley 42 is controlled so that the actual input-shaft speed NIN becomes substantially equal to the target input-shaft speed NINT, in other words, so that the speed ratio γ of the belt-type continuously variable transmission 18 becomes equal to a target speed ratio (=NINT/NOUT) corresponding to the target input-shaft rotation speed NINT. In this embodiment, the speed ratio control unit 100 and the speed ratio control circuit 50 functions as a speed ratio control device according to the invention.

Figure 6:
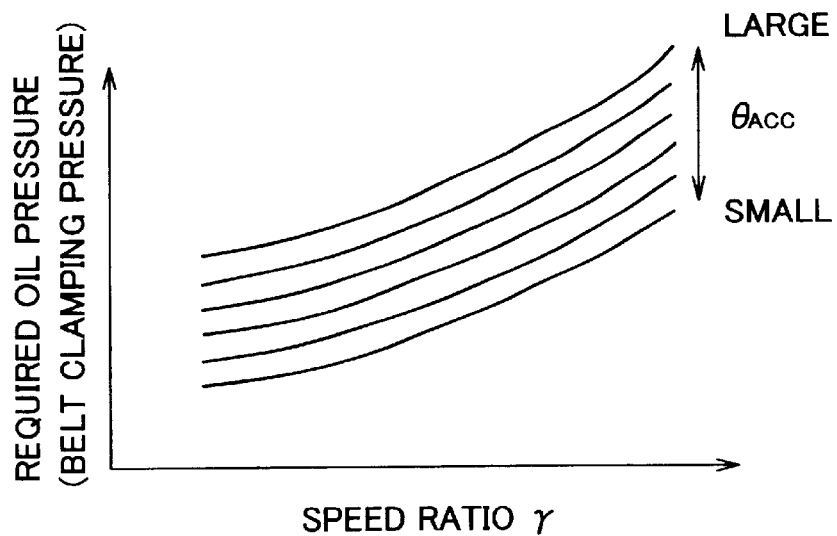
FIG. 6 is a graph indicating a required hydraulic pressure map used to determine a required hydraulic pressure for use in belt clamping pressure control performed by the clamping pressure control unit as shown in FIG. 3.

The clamping pressure control unit 102 controls the belt clamping pressure of the continuously variable transmission 18, more specifically, regulates the hydraulic pressure $P_O$ in the hydraulic cylinder of the output-side variable pulley 46, by controlling current for energizing the solenoid valve 74 of the clamping pressure control circuit 70 (FIG. 5) in accordance with a predetermined map as shown in FIG. 6. This map indicates a required hydraulic pressure (corresponding to a required clamping pressure) that is predetermined by using, as parameters, the speed ratio γ and the accelerator operating amount $\theta_{ACC}$ corresponding to the transferred torque, so that the torque transfer belt will not slip. The required hydraulic pressure, or the required belt clamping pressure $P_B$, is basically represented by an expression (1) below, using input torque $T_{IN}$, a friction coefficient $\mu$, a belt engagement diameter R of the input-side variable pulley 42, and a pulley area A. The input torque $T_{IN}$ and the belt engagement diameter R correspond to the accelerator operating amount $\theta_{ACC}$ and the speed ratio $\gamma$, respectively. The required hydraulic pressure map as indicated in FIG. 6 is determined based on the expression (1). In the expression (1), $\alpha$ is a constant that is determined in view of a safety factor that involves a control error, or the like, and is equal to a value greater than 1.0. The required hydraulic pressure map as indicated in FIG. 6 represents clamping pressure control conditions, and is pre-stored in the map storage device 116 of the CVT controller 80 as in the case of the shift map. Instead of the accelerator operating amount $\theta_{ACC}$, the throttle opening or the torque of the engine 12 may be used. In this embodiment, the clamping pressure control unit 102 and the clamping pressure control circuit 70 function as a clamping pressure device according to the invention.

$$P_B = (T_{IN}/\mu \cdot R \cdot A) \times \alpha \tag{1}$$

Figure 8:
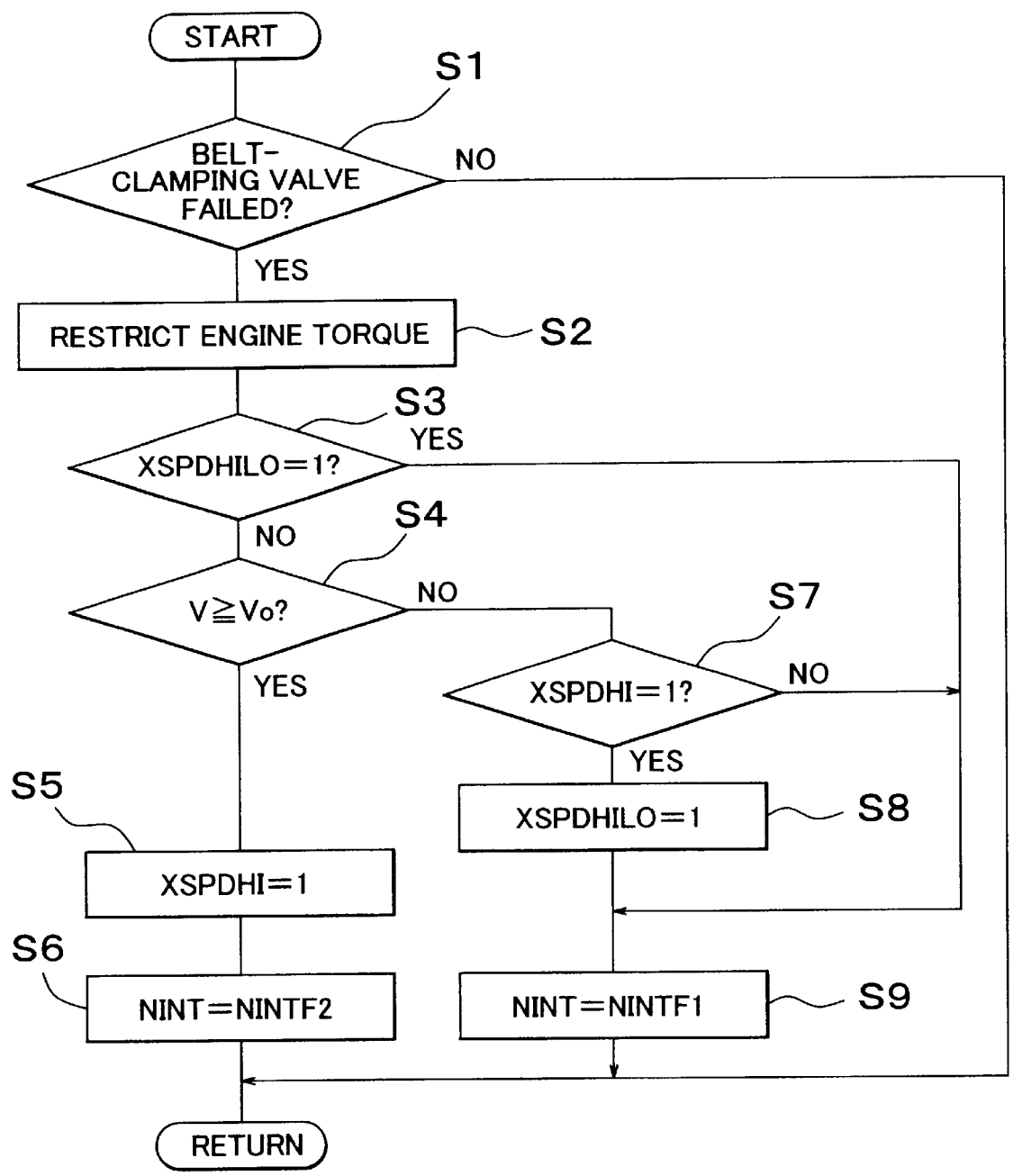
FIG. 8 is a flowchart illustrating an operation performed to set a target input-shaft rotation speed when a valve of the clamping pressure control circuit fails and the belt clamping pressure is raised to a high level.

When the linear solenoid valve 74 or the clamping pressure control valve 76 of the clamping pressure control circuit 70 for controlling the belt clamping pressure fails, the failure determining unit 104, the failure-time speed ratio setting unit 106 and the engine torque restricting unit 108 set a target rotation speed NINT independently of the shift map as indicated in FIG. 7, and cause the speed ratio control unit 100 to perform shift control in accordance with the target rotation speed NINT, and restrict engine output control executed by an engine ECU 118. More specifically, signal processing is performed according to the flowchart of FIG. 8. The process as illustrated in FIG. 8 is cyclically executed at predetermined time intervals. Step S1 is executed by the failure determining unit 104. Step S2 is executed by the engine torque restricting unit 108. Steps S3 to S9 are executed by the failure-time speed ratio setting unit 106. The engine torque restricting unit 108 corresponds to a failure-time input torque restricting unit.

In step S1 of FIG. 8, it is determined whether the linear solenoid valve 74 or the clamping pressure control valve 76 of the clamping pressure control circuit 70 fails and the belt clamping pressure is fixed to the high-pressure side. This determination is made by, for example, comparing the oil pressure $P_O$ of the output-side variable pulley 46 detected by an oil pressure sensor 94 with a command value (or a magnetizing current value) output to the linear solenoid valve 74. The above-mentioned failure of the linear solenoid valve 74 or the clamping pressure control valve 76 may be a mechanical failure or a failure in an electric system or in a control system. If there is no failure, the process immediately ends. Conversely, if step S1 determines that the belt clamping pressure is fixed to the high-pressure side due to a failure in the linear solenoid valve 74 or control valve 76, the process proceeds to step S2.

In step S2, the output control of the engine 12 performed by the engine ECU 118 is restricted so that the durability of the torque transfer belt 48 will not be lowered or deteriorated by excessively large torque applied to the belt-type continuously variable transmission 18. In this embodiment, an upper-limit value of the engine output is determined so as to provide a torque that enables the vehicle to limp-home to a repair shop or the like. More specifically, the opening of the electric throttle valve 30 and/or the amount of fuel injected is/are restricted by setting the upper limit of the vehicle speed V to, for example, 60 km/h, or setting the upper limit of the engine output to an output value obtained when the accelerator operation amount $\theta_{ACC}$ is equal to, for example, 60%.

Figure 9A:
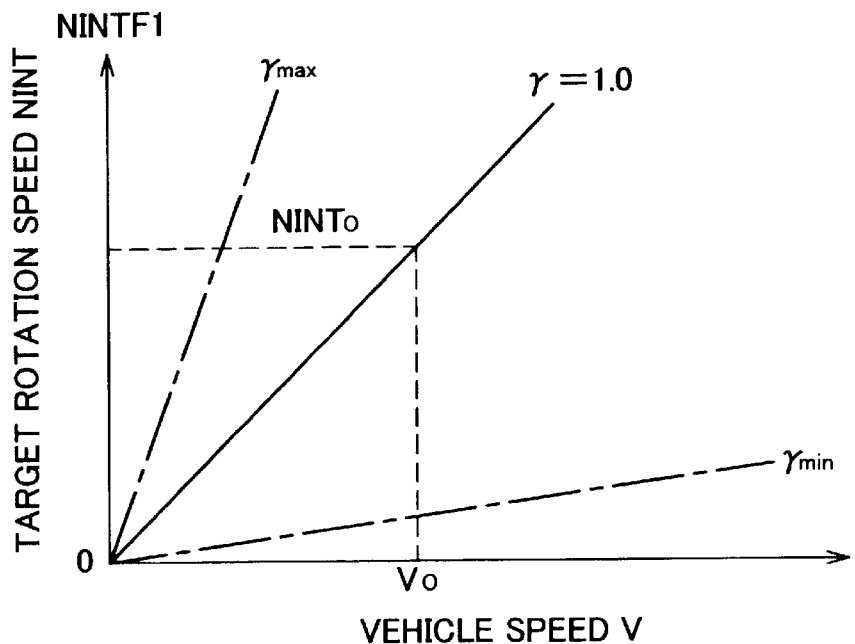
FIG. 9A is a graph indicating a failure-time speed ratio map used to determine a target rotation speed NINT in step S9 of FIG. 8.
Figure 9B:
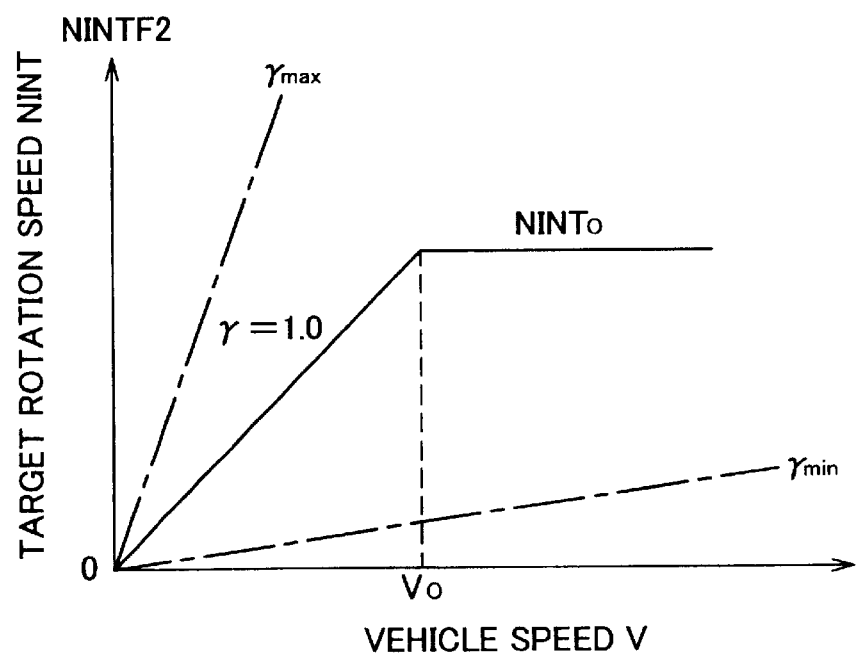
FIG. 9B is a graph indicating a failure-time speed ratio map used to determine a target rotation speed NINT in step S6 of FIG. 8.

In step S3, it is determined whether a high speed failure-time vehicle speed reduction flag XSPDHILO is equal to "1". If XSPDHILO is equal to 1, step S9 is immediately executed. In the first control cycle executed after the valve 74 or 76 fails, however, the flag XSPDHILO has been set to 0 through initialization, and the process proceeds to step S4. In step S4, it is determined whether the vehicle speed V is equal to or higher than a fixed set value Vo that has been determined in advance. If V≧Vo, a high-speed failure flag XSPDHI is set to 1 in step S5. Subsequently, step S6 is executed to calculate a target input-shaft rotation speed NINT in accordance with a map NINTF2 provided for the occasion of a valve failure at a high vehicle speed. In the map NINTF2 as shown in, for example, FIG. 9B, if the vehicle speed V is equal to or less than the set value Vo, the target input-shaft rotation speed NINT is set so that the speed ratio $\gamma$ is equal to 1, and if the vehicle speed V is equal to or greater than the set value Vo, the target rotation speed NINT is fixed to the fixed value NINTo. The set value Vo and the fixed value NINTo are determined taking account of the case where the transmission is shifted down from the minimum speed ratio $\gamma$ min, so that riding comfort will not be considerably degraded. The fixed value NINTo corresponds to a speed ratio suitable for high-speed running of the vehicle. The speed ratio $\gamma$ varies with the vehicle speed V as a parameter, namely, the speed ratio $\gamma$ decreases with increases in the vehicle speed V. The map NINTF2 is pre-stored in the map storage device 116 of the CVT controller 80.

If a negative decision "NO" is obtained in step S4, that is, if the vehicle speed V is less than Vo, it is determined in step S7 whether the high-speed failure flag XSPDHI is equal to 1. If XSPDHI is not equal to 1, that is, if the vehicle speed V at the time of a valve failure is less than the set value Vo, step S9 is immediately executed. If XSPDHI is equal to 1, that is, if the vehicle speed V at the time of a valve failure is equal to or greater than the set value Vo, and then decreases below the set value Vo, the high-speed failure-time vehicle speed reduction flag XSPDHILO is set to 1 in step S8, and then step S9 is executed. In step S9, a target input-shaft rotation speed NINT is calculated in accordance with a map NINTF1 provided for the occasion of a valve failure at a low vehicle speed. In the map NINTF1 as shown in, for example, FIG. 9A, the target input-shaft rotation speed NINT is set so as to provide a speed ratio $\gamma$ of 1.0, at which the load on the torque transfer belt 48 is minimized. In this connection, if the belt engagement diameter of the input-side variable pulley 42 becomes greater or less than the belt engagement diameter of the output-side variable pulley 46, the area of contact of the torque transfer belt 48 with the pulley having the smaller belt engagement diameter is reduced, resulting in an increase in the load per unit area. However, if the speed ratio $\gamma$ is equal to 1, that is, if the belt engagement diameter of the input-side variable pulley 42 is equal to that of the output-side variable pulley 46, even load is applied to the torque transfer belt 48, and the maximum load per unit area is reduced. The speed ratio $\gamma$ of 1.0 corresponds to a low-load speed ratio. The map NINTF1 is designed such that a target input-shaft rotation speed NINT is set so as to keep the speed ratio $\gamma$ equal to 1.0 even if the vehicle speed V becomes greater than the set value Vo. In this embodiment, since the engine torque is restricted in step S2, there is no danger of over-revolution (over-speed) of the engine 12. The map NINTF1 is pre-stored in the map storage device 116 of the CVT controller 80.

After a target rotation speed NINT is determined in step S6 or S9 as described above, the shift control unit 100 performs shift control on the belt-type continuously variable transmission 18 by using the target rotation speed NINT.

In the flowchart of FIG. 8, if a valve failure occurs when the vehicle speed V is lower than the set value Vo and then the vehicle speed V increases to be equal to or higher than the set value Vo, step S5 and step S6 are executed so that a target rotation speed NINT is calculated in accordance with the map NINTF2 provided for the occasion of a failure at a high vehicle speed. However, once the speed ratio $\gamma$ of the belt-type continuously variable transmission 18 becomes equal to 1.0, no problem arises even if the speed ratio $\gamma$ remains equal to 1.0 after the vehicle speed V exceeds the set value Vo. Accordingly, it is possible to eliminate steps S5 and S7 in FIG. 8, for example, so that step S8 is always executed when a negative decision "NO" is obtained in step S4, so as to set the flag XSPDHILO to 1. In this case, step S6 is not executed, namely, the map NINTF2 is not employed, even after the vehicle speed V becomes higher than the set value Vo after a valve failure occurs while the vehicle speed V is lower than the set value Vo.

In the illustrated embodiment, if the vehicle speed V is equal to or lower than the set value Vo when the linear solenoid valve 74 or the clamping pressure control valve 76 for controlling the belt clamping pressure fails and the belt clamping pressure is fixed to the high-pressure side, the speed ratio $\gamma$ of the belt-type continuously variable transmission 18 is set to 1.0, which minimizes the load applied to the torque transfer belt 48. Thus, the load on the torque transfer belt 48 is reduced, and the durability of the belt improves.

Furthermore, since the speed ratio $\gamma$ of the belt-type continuously variable transmission 18 is simply kept equal to "1.0" in the illustrated embodiment, the apparatus has a greatly simplified construction and is available at a reduced cost, as compared with the conventional arrangement in which the belt clamping pressure is controlled by using the clutch pressure of the forward/reverse-drive switching device 16. When the speed ratio $\gamma$ of the belt-type continuously variable transmission 18 is fixed to 1.0, the vehicle running performance greatly deteriorates because of an incapability of increasing or decreasing the torque by changing the speed ratio. However, the arrangement of the above embodiment can accomplish an intended purpose in that the vehicle is allowed to limp-home to a repair shop, or the like, rather than being unable to run due to, for example, breakage of the torque transfer belt 48.

Furthermore, the engine torque is restricted in step S2 in this embodiment, thereby further effectively preventing an excessively great load from being applied to the torque transfer belt 48 or slippage of the torque transfer belt 48.

If a valve failure occurs when the vehicle speed V is equal to or higher than the set value Vo, the speed ratio $\gamma$ of the belt-type continuously variable transmission 18 is set to a value that is less than 1.0, more specifically, the target input-shaft rotation speed NINT is set to the fixed NINTo, so that downshift takes place by smaller degrees. This prevents the CVT 18 from being shifted down by a great degree against the driver's intention, thereby avoiding large shift shocks and greatly degraded riding comfort that would be caused by the inertia of the engine 12, the torque converter 14, etc. at the time of great downshift. Also, the engine 12 is free from a serious failure, such as over-revolution or over-speed, which would otherwise occur when the revolution speed of the engine 12 exceeds the allowable revolution speed. In some cases, an upshift of the transmission 18 may occur depending on the vehicle driving or running state at the time of a failure. If the speed ratio $\gamma$ becomes lower than 1.0, the degree of the upshift increases, but no serious failure, such as over-revolution, will occur because the engine speed NE is reduced during upshifting.

Figure 10:
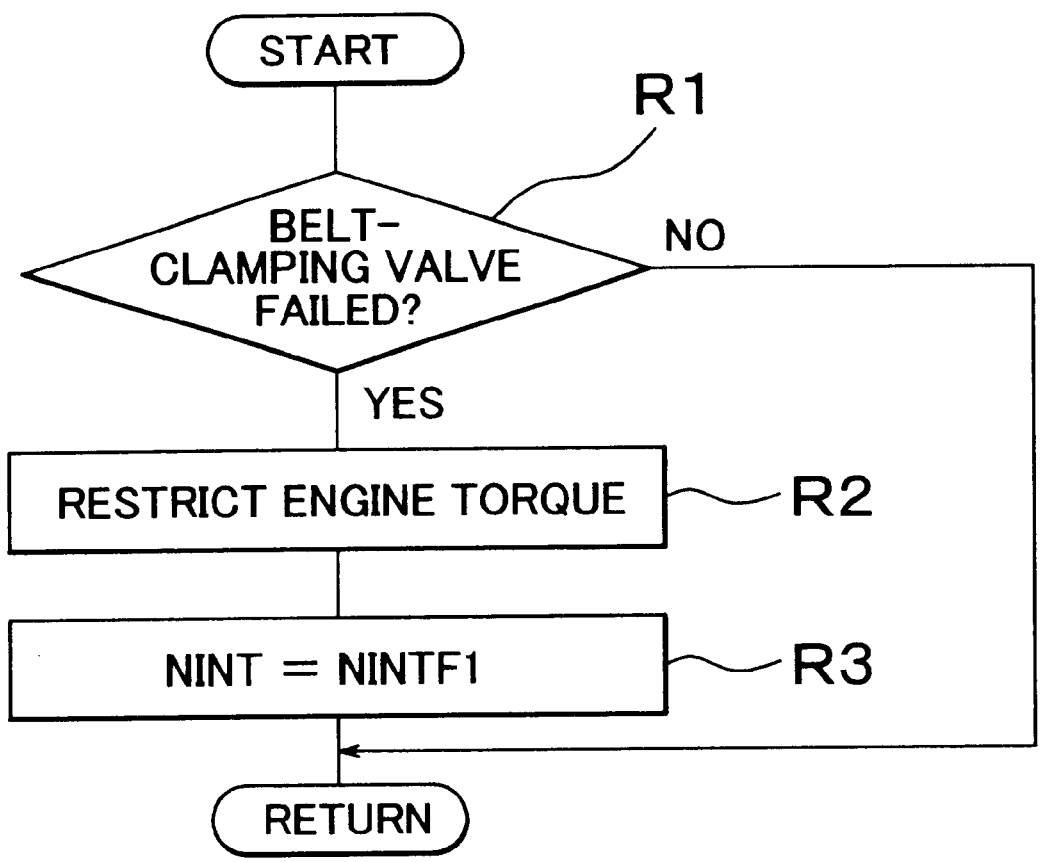
FIG. 10 is a flowchart illustrating another example of the operation performed to set a target input-shaft rotation speed when a valve of the clamping pressure control circuit fails and the belt clamping pressure is raised to a high level.

In the illustrated embodiment, a target rotation speed NINT is set using one of two different maps that is selected depending upon whether the vehicle speed V at the time of a failure is equal to or higher than the set value Vo. However, if the minimum speed ratio $\gamma$min is close to 1.0, for example, a target input-shaft rotation speed NINT is set by using only the map NINTF1 so that the speed ratio $\gamma$ is kept equal to 1.0, as shown in the flowchart of FIG. 10. Steps R1, R2, R3 in the flowchart FIG. 10 are substantially the same as steps S1, S2, S9, respectively in FIG. 8.

While the embodiment of the invention has been described above with reference to the drawings, it is to be understood that the disclosed embodiment is merely illustrative. The invention may be embodied with various modifications and equivalent arrangements based on the knowledge of persons skilled in the art.

The failure-time input torque restricting unit corresponding to the engine torque restricting unit 108 in the embodiment is designed so as to, for example, limit the output of a drive power source to or below a predetermined value. In the case of the belt-type continuously variable transmission, the predetermined value of the output of the power source is set in view of the low-load speed ratio so as to achieve a minimum torque required for limp-home. However, the invention is not limited to the use of the failure-time input torque restricting unit. For example, instead of restricting the output of the drive power source, the input torque transmitted to the continuously variable transmission may be restricted by various means, for example, by limiting the engaging torque of a clutch or a brake disposed between the drive power source and the belt-type continuously variable transmission to or below a predetermined value.

In the illustrated embodiment, the apparatus is controlled by the controller (e.g., the ECU 80), which is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. An apparatus for controlling a belt-type continuously variable transmission of a motor vehicle that is provided in a power transmission path, the transmission having an input shaft disposed on a power source side of the transmission, an output shaft disposed on a side of the transmission opposite from the power source side, a pair of pulleys mounted on the input shaft and the output shaft, respectively, and a torque transfer belt that is wound around the pulleys to effect power transmission by use of frictional force, the transmission having a continuously variable speed ratio, which is a ratio of a rotation speed of the input shaft to a rotation speed of the output shaft, the apparatus comprising a controller that:

controls the speed ratio of the continuously variable transmission by changing a groove width of each of the pulleys;

controls a belt clamping pressure applied to at least one of the pulleys to clamp the torque transfer belt; and sets the speed ratio of the continuously variable transmission to a low-load speed ratio when it is determined that control of the belt clamping pressure has failed and the belt clamping pressure is raised to a high level, the low-load speed ratio being predetermined so that a load that is applied to the torque transfer belt is substantially minimized.

2. The apparatus according to claim 1, wherein the speed ratio of the continuously variable transmission is controlled within a control range that includes 1.0, and the low-load speed ratio is substantially equal to 1.0.

3. The apparatus according to claim 1, wherein the controller also restricts an input torque that is transmitted from the power source to the continuously variable transmission, when it is determined that control of the belt clamping pressure has failed and the belt clamping pressure is raised to a high level.

4. The apparatus according to claim 1, wherein the controller sets the speed ratio to the low-load speed when the rotation speed of the output shaft is less than a predetermined value, and sets the speed ratio to a high-speed speed ratio that is smaller than the low-load speed ratio when the rotation speed of the output shaft is equal to or greater than the predetermined value.

5. The apparatus according to claim 2, wherein the controller also restricts an input torque that is transmitted from the power source to the continuously variable transmission, when it is determined that control of the belt clamping pressure has failed and the belt clamping pressure is raised to a high level.

6. The apparatus according to claim 2, wherein the controller sets the speed ratio to the low-load speed when the rotation speed of the output shaft is less than a predetermined value, and sets the speed ratio to a high-speed speed ratio that is smaller than the low-load speed ratio when the rotation speed of the output shaft is equal to or greater than the predetermined value.

7. The apparatus according to claim 3, wherein the controller sets the speed ratio to the low-load speed when the rotation speed of the output shaft is less than a predetermined value, and sets the speed ratio to a high-speed speed ratio that is smaller than the low-load speed ratio when the rotation speed of the output shaft is equal to or greater than the predetermined value.

8. The apparatus according to claim 5, wherein the controller sets the speed ratio to the low-load speed when the rotation speed of the output shaft is less than a predetermined value, and sets the speed ratio to a high-speed speed ratio that is smaller than the low-load speed ratio when the rotation speed of the output shaft is equal to or greater than the predetermined value.

9. The apparatus according to claim 1, wherein the controller determines that control of the belt clamping pressure has failed by determining that at least one of (a) a valve that is used to control the belt clamping pressure, (b) an electrical system that supplies power to the valve, and (c) a control device that controls the valve, has failed to operate properly.

10. A method of controlling a belt-type continuously variable transmission of a motor vehicle that is provided in a power transmission path, the transmission having an input shaft disposed on a power source side of the transmission, an output shaft disposed on a side of the transmission opposite from the power source side, a pair of pulleys mounted on the input shaft and the output shaft, respectively, and a torque transfer belt that is wound around the pulleys to effect power transmission by use of frictional force, the transmission having a continuously variable speed ratio, which is a ratio of a rotation speed of the input shaft to a rotation speed of the output shaft, the method comprising the steps of:

controlling the speed ratio of the continuously variable transmission by changing a groove width of each of the pulleys;

controlling a belt clamping pressure applied to at least one of the pulleys to clamp the torque transfer belt; and setting the speed ratio of the continuously variable transmission to a low-load speed ratio when it is determined that control of the belt clamping pressure has failed and the belt clamping pressure is raised to a high level, the low-load speed ratio being predetermined so that a load that is applied to the torque transfer belt is substantially minimized.

11. The method according to claim 10, wherein the speed ratio of the continuously variable transmission is controlled within a control range that includes 1.0, and the low-load speed ratio is substantially equal to 1.0.

12. The method according to claim 10, further comprising the step of:

restricting an input torque that is transmitted from the power source to the continuously variable transmission, when it is determined that control of the belt clamping pressure has failed and the belt clamping pressure is raised to a high level.

13. The method according to claim 10, wherein the speed ratio of the transmission is set to the low-load speed when the rotation speed of the output shaft is less than a predetermined value, and is set to a high-speed speed ratio that is smaller than the low-load speed ratio when the rotation speed of the output shaft is equal to or greater than the predetermined value.

14. The method according to claim 11, further comprising the step of:

restricting an input torque that is transmitted from the power source to the continuously variable transmission, when it is determined that control of the belt clamping pressure has failed and the belt clamping pressure is raised to a high level.

15. The method according to claim 11, wherein the speed ratio of the transmission is set to the low-load speed when the rotation speed of the output shaft is less than a predetermined value, and is set to a high-speed speed ratio that is smaller than the low-load speed ratio when the rotation speed of the output shaft is equal to or greater than the predetermined value.

16. The method according to claim 12, wherein the speed ratio of the transmission is set to the low-load speed when the rotation speed of the output shaft is less than a predetermined value, and is set to a high-speed speed ratio that is smaller than the low-load speed ratio when the rotation speed of the output shaft is equal to or greater than the predetermined value.

17. The method according to claim 14, wherein the speed ratio of the transmission is set to the low-load speed when the rotation speed of the output shaft is less than a predetermined value, and is set to a high-speed speed ratio that is smaller than the low-load speed ratio when the rotation speed of the output shaft is equal to or greater than the predetermined value.

18. The method according to claim 10, wherein it is determined that control of the belt clamping pressure has failed by determining that at least one of (a) a valve that is used to control the belt clamping pressure, (b) an electrical system that supplies power to the valve, and (c) a control device that controls the valve, has failed to operate properly.

* * * * *